(12) United States Patent
Kishimoto (10) Patent No.: US 11,978,889 B2
(45) Date of Patent: May 7, 2024

(54) METHOD OF PRODUCING ELECTRODE MIXTURE PASTE AND METHOD OF PRODUCING NON-AQUEOUS SECONDARY BATTERY

(71) Applicant: TOYOTA JIDOSHA KABUSHIKI KAISHA, Toyota (JP)

(72) Inventor: Naoya Kishimoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 209 days.

(21) Appl. No.: 17/029,118

(22) Filed: Sep. 23, 2020

(65) Prior Publication Data
US 2021/0218017 A1    Jul. 15, 2021

(30) Foreign Application Priority Data
Jan. 14, 2020   (JP) ................ 2020-003487

(51) Int. Cl.
| | | |
|---|---|---|
| *H01M 4/36* | (2006.01) | |
| *H01M 4/139* | (2010.01) | |
| *H01M 4/62* | (2006.01) | |
| *H01M 10/0569* | (2010.01) | |

(52) U.S. Cl.
CPC ........... *H01M 4/364* (2013.01); *H01M 4/139* (2013.01); *H01M 4/623* (2013.01); *H01M 10/0569* (2013.01)

(58) Field of Classification Search
CPC .. H01M 4/364; H01M 4/139; H01M 10/0569; H01M 4/623
USPC ....................................................... 429/212
See application file for complete search history.

(56) References Cited

U.S. PATENT DOCUMENTS

| | | | |
|---|---|---|---|
| 4,945,937 A | 8/1990 | Scribner | |
| 2016/0075052 A1 | 3/2016 | Mio et al. | |
| 2020/0091503 A1 | 3/2020 | Nakamura | |

FOREIGN PATENT DOCUMENTS

| | | | | |
|---|---|---|---|---|
| CN | 105428608 A | | 3/2016 | |
| CN | 2019537212 A | * | 12/2019 | |
| CN | 110679026 A | | 1/2020 | |
| JP | 2014103019 A | * | 6/2014 | ............. C01B 33/32 |
| JP | 2014203561 A | * | 10/2014 | |
| JP | 2016058355 A | | 4/2016 | |
| JP | 2017016804 A | | 1/2017 | |
| JP | 2018041616 A | * | 3/2018 | |
| JP | 2019-537212 A | | 12/2019 | |
| WO | 2018082601 A1 | | 5/2018 | |

(Continued)

OTHER PUBLICATIONS

Kondo (translation) (Year: 2014).*

(Continued)

*Primary Examiner* — Matthew T Martin
*Assistant Examiner* — Paul Christian St Wyrough
(74) *Attorney, Agent, or Firm* — Dickinson Wright, PLLC (57) ABSTRACT

A method of producing an electrode mixture paste includes a kneading process in which an electrode active material, a conductive material, a binding material, a dispersant and a non-aqueous solvent are kneaded to obtain an electrode mixture paste and an ultrasonic wave application process in which ultrasonic waves are applied to the electrode mixture paste without evaporating the non-aqueous solvent from the electrode mixture paste.

3 Claims, 8 Drawing Sheets

(56) References Cited

FOREIGN PATENT DOCUMENTS

WO     WO-2018216585 A1 * 11/2018 .............. B60L 50/64
WO     WO-2019235128 A1 * 12/2019

OTHER PUBLICATIONS

Yoshida (translation) (Year: 2014).*
Takahashi (translation) (Year: 2019).*
Toshikazu (translation) (Year: 2018).*
Ho machine translation (Year: 2019).*
Yamashita (translation) (Year: 2018).*

* cited by examiner

METHOD OF PRODUCING ELECTRODE MIXTURE PASTE AND METHOD OF PRODUCING NON-AQUEOUS SECONDARY BATTERY

CROSS-REFERENCE TO RELATED APPLICATION

This application claims priority to Japanese Patent Application No. 2020-003487 filed on Jan. 14, 2020, incorporated herein by reference in its entirety.

BACKGROUND

1. Technical Field

The present disclosure relates to a method of producing an electrode mixture paste and a method of producing a non-aqueous secondary battery.

2. Description of Related Art

In Japanese Unexamined Patent Application Publication No. 2016-58355 (JP 2016-58355 A), the following method of producing a negative electrode mixture paste (slurry) is disclosed. Specifically, the method of producing a negative electrode mixture paste (slurry) includes a dissolving process in which a thickener is dissolved in a solvent, a viscosity adjusting process in which the viscosity of the solution of the thickener dissolved in the dissolving process is adjusted, a stirring process in which the solution of the thickener whose viscosity is adjusted in the viscosity adjusting process and an electrode active material powder are mixed to produce a first mixture and the first mixture is stirred to produce a second mixture, a heating process in which the solution of the thickener or the first mixture is heated from when the solution of the thickener is produced in the dissolving process until stirring of the first mixture in the stirring process starts and thus the solution of the thickener contained in the first mixture when the first mixture is stirred in the stirring process is heated, and a kneading process in which the solution of the thickener contained in the second mixture produced in the stirring process and an electrode active material powder are kneaded to produce a third mixture.

In the method of producing a negative electrode mixture paste (slurry) of JP 2016-58355 A, in the viscosity adjusting process, ultrasonic waves are applied to the solution of the thickener supplied into the housing to adjust the viscosity of the solution. In addition, in JP 2016-58355 A, when a positive electrode mixture paste (slurry) is produced, microwaves are emitted when a binder such as polyvinylidene fluoride is dissolved in a solvent such as N-methylpyrrolidone, but ultrasonic waves are not emitted when the solution is mixed with a conductive material such as acetylene black. It is described that, when the amount of conductive material mixed in such as acetylene black is adjusted, the viscosity of the solution is adjusted.

SUMMARY

However, in a method in which, when an electrode mixture paste in which an electrode active material, a conductive material, a binding material, a dispersant, and a non-aqueous solvent are mixed is produced, as in JP 2016-58355 A, the viscosity of the electrode mixture paste is adjusted by adjusting the amount of conductive material added, and since the content of the component of the electrode mixture paste changes as the amount of conductive material added increases or decreases, the performance of the electrode also varies.

Incidentally, regarding the electrode mixture paste, it is desired for the viscosity in a low shear rate range of $2.15\ s^{-1}$ or less (low shear rate scope) to be sufficiently reduced while the change in viscosity at a high shear rate range of $100\ s^{-1}$ or more (high shear rate scope) is minimized. However, in a method in which the amount of conductive material added is adjusted and thus the viscosity of the electrode mixture paste is adjusted, the viscosity at each shear rate generally increases or decreases, which cannot satisfy the above requirement. Specifically, in order to sufficiently reduce the viscosity in a low shear rate range of $2.15\ s^{-1}$ or less, when the amount of conductive material added is sufficiently reduced, the viscosity in a high shear rate range of $100\ s^{-1}$ or more is significantly lowered.

The present disclosure has been made in view of such circumstances and an object of the present disclosure is to provide a method of producing an electrode mixture paste in which a viscosity of an electrode mixture paste obtained by performing a kneading process in a low shear rate range in which the shear rate is $2.15\ s^{-1}$ or less can be reduced while the change in viscosity in a high shear rate range in which the shear rate is $100\ s^{-1}$ or more is minimized and a method of producing a non-aqueous secondary battery using the electrode mixture paste produced by the method of producing an electrode mixture paste.

An aspect of the present disclosure is a method of producing an electrode mixture paste including: a kneading process in which an electrode active material, a conductive material, a binding material, a dispersant and a non-aqueous solvent are kneaded to obtain an electrode mixture paste; and an ultrasonic wave application process in which ultrasonic waves are applied to the electrode mixture paste without evaporating the non-aqueous solvent from the electrode mixture paste.

The method of producing an electrode mixture paste includes a kneading process and a subsequent ultrasonic wave application process. The kneading process is a process in which an electrode active material, a conductive material, a binding material, a dispersant and a non-aqueous solvent are kneaded to obtain an electrode mixture paste. The ultrasonic wave application process is a process in which ultrasonic waves are applied (that is, ultrasonic vibration is applied) to the electrode mixture paste obtained in the kneading process.

In this manner, when ultrasonic waves are applied to the electrode mixture paste, adsorption of the dispersant on the electrode active material (particles) and the conductive material (particles) is promoted. Thereby, the viscosity of the electrode mixture paste in a low shear rate range (low shear rate scope) in which the shear rate is $2.15\ s^{-1}$ or less can be reduced.

Moreover, in the ultrasonic wave application process, ultrasonic waves are applied to the electrode mixture paste while evaporation of the non-aqueous solvent from the electrode mixture paste is prevented. In the ultrasonic wave application process, when evaporation of the non-aqueous solvent from the electrode mixture paste is prevented, it is possible to prevent the change in solid content of the electrode mixture paste. Therefore, it is possible to minimize the change in viscosity of the electrode mixture paste in a high shear rate range in which the shear rate is $100\ s^{-1}$ or more.

As described above, according to the production method, it is possible to reduce the viscosity of the electrode mixture paste obtained by performing the kneading process in a low shear rate range in which the shear rate is 2.15 s$^{-1}$ or less while the change in viscosity in a high shear rate range in which the shear rate is 100 s$^{-1}$ or more (high shear rate scope) is minimized.

Here, the dispersant adsorbs to the electrode active material (particles) and the conductive material (particles) and thus the dispersant has a function of improving slippage between the particles to which the dispersant adsorbs.

In addition, the method of producing an electrode mixture paste may further include a filtering process in which foreign substances contained in the electrode mixture paste are removed when the electrode mixture paste passes through a filter after the ultrasonic wave application process.

In the related art, a filtering process in which the electrode mixture paste obtained by performing the kneading process passes through a filter and foreign substances contained in the electrode mixture paste are removed from the electrode mixture paste has been performed. However, since the electrode mixture paste obtained by performing the kneading process has a high viscosity in a low shear rate range in which the shear rate is 2.15 s$^{-1}$ or less, a part of the filter is clogged quickly, the differential pressure becomes large, and it is necessary to replace the filter soon. Specifically, for example, due to a rush phenomenon, in a mode in which a cake layer formed of an electrode mixture paste is formed on the surface of the filter, and thereby a part of the filter is blocked, a part of the filter may be clogged and the differential pressure may increase.

On the other hand, the production method includes a filtering process after the ultrasonic wave application process. Therefore, the electrode mixture paste subjected to the ultrasonic wave application process passes through the filter, and foreign substances contained in the electrode mixture paste are removed from the electrode mixture paste. As described above, when the ultrasonic wave application process is performed, the viscosity of the electrode mixture paste in a low shear rate range of 2.15 s$^{-1}$ or less can be reduced. Therefore, in the production method, before the filtering process is performed, the viscosity of the electrode mixture paste in a low shear rate range of 2.15 s$^{-1}$ or less can be reduced.

In this manner, when the viscosity of the electrode mixture paste in a low shear rate range of 2.15 s$^{-1}$ or less is reduced, clogging of the filter due to the electrode mixture paste is unlikely to occur. Specifically, when the viscosity of the electrode mixture paste in a low shear rate range of 2.15 s$^{-1}$ or less is reduced, for example, a cake layer formed of the electrode mixture paste is unlikely to be formed on the surface of the filter. Thereby, it is possible to reduce a rising rate (rising speed) of the differential pressure of the filter and increase the lifespan of the filter.

Here, the filter may be, for example, a filter having performance in which 90% or more of foreign substances having a size of 50 μm or more contained in the electrode mixture paste can be collected.

In addition, in a method of producing an electrode mixture paste, while the inside of a flow pipe that connects a kneading device for performing the kneading process or a tank in which the electrode mixture paste obtained by the kneading using the kneading device is accommodated to the filter for performing the filtering process is filled with the electrode mixture paste, the electrode mixture paste is caused to continuously flow from the kneading device or the tank to the filter through the flow pipe, and in the ultrasonic wave application process, ultrasonic waves are applied to the electrode mixture paste before the electrode mixture paste that continuously flows in the flow pipe reaches the filter.

In the production method, while the inside of the flow pipe that connects the kneading device for performing the kneading process to the filter for performing the filtering process is filled with the electrode mixture paste subjected to the kneading process (in other words, while the electrode mixture paste is allowed to be subjected to the kneading process to remain in the flow pipe without surplus space), the electrode mixture paste is caused to continuously flow from the kneading device to the filter through the flow pipe. Alternatively, while the inside of the flow pipe that connects the tank in which the electrode mixture paste obtained by performing kneading using the kneading device is accommodated to the filter that performs the filtering process is filled with the electrode mixture paste subjected to the kneading process, the electrode mixture paste is caused to continuously flow from the tank to the filter through the flow pipe. Then, before the electrode mixture paste that continuously flows in the flow pipe reaches the filter, ultrasonic waves are applied to the electrode mixture paste.

Accordingly, since ultrasonic waves are applied to the electrode mixture paste while evaporation of the non-aqueous solvent from the electrode mixture paste is prevented, it is possible to appropriately prevent the solid content of the electrode mixture paste from changing. Thereby, it is possible to reduce the viscosity of the electrode mixture paste obtained by performing the kneading process in a low shear rate range in which the shear rate is 2.15 s$^{-1}$ or less while the change in viscosity in a high shear rate range in which the shear rate is 100 s$^{-1}$ or more is minimized.

In addition, the method of producing an electrode mixture paste further includes a viscosity measurement process in which the viscosity of the electrode mixture paste that continuously flows to the filter in the flow pipe is measured at a first shear rate in a shear rate range of 2.15 s$^{-1}$ or less after the ultrasonic wave application process and before the filtering process, when a value of the viscosity measured in the viscosity measurement process is larger than a preset threshold value, a value of a frequency of the ultrasonic waves applied in the ultrasonic wave application process is increased and the ultrasonic wave application process is performed.

The production method further includes a viscosity measurement process in which the viscosity of the electrode mixture paste that continuously flows to the filter in the flow pipe is measured at a first shear rate in a shear rate range of 2.15 s$^{-1}$ or less (shear rate scope) after the ultrasonic wave application process and before the filtering process.

In addition, in the production method, when a value of the viscosity of the electrode mixture paste at a first shear rate measured in the viscosity measurement process is larger than a preset threshold value, a value of a frequency of the ultrasonic waves applied in the ultrasonic wave application process is increased (that is, a set value of the frequency of ultrasonic waves is changed to a value larger than a currently set frequency value), and the subsequent ultrasonic wave application process is performed. In this manner, when the viscosity of the electrode mixture paste is feedback-controlled, in the ultrasonic wave application process, the viscosity (mPa·s) at a first shear rate (shear rate selected from a low shear rate range of 2.15 s$^{-1}$ or less) can be appropriately adjusted to a threshold value or less.

Here, the threshold value is preferably set to a value at which it is possible to effectively minimize clogging of the filter, and for example, when the first shear rate is set to 2.15

$s^{-1}$ (that is, when the viscosity at a shear rate of 2.15 $s^{-1}$ is measured in the viscosity measurement process), the threshold value is preferably 15,000 (mPa·s).

Another aspect of the present disclosure is a method of producing a non-aqueous secondary battery including a process in which the electrode mixture paste produced by the method of producing an electrode mixture paste according to any of the above methods is applied to a surface of a current collecting member and dried to obtain an electrode, and a process in which the electrode is accommodated in a battery case to obtain the non-aqueous secondary battery.

The method of producing a non-aqueous secondary battery includes a process in which the electrode mixture paste produced by the method of producing an electrode mixture paste is applied to a surface of a current collecting member and dried to obtain an electrode. In addition, the method includes a process in which the electrode is accommodated in a battery case to obtain a non-aqueous secondary battery.

Incidentally, when the electrode mixture paste is applied to the surface of the current collecting member, generally, a shear force at a high shear rate of 100 $s^{-1}$ or more is applied to the electrode mixture paste. Therefore, the viscosity of the electrode mixture paste in a high shear rate range of 100 $s^{-1}$ or more affects the applicability of the electrode mixture paste to the current collecting member. Therefore, in the related art, in the kneading process, kneading is performed so that the viscosity of the electrode mixture paste at a shear rate in a high shear rate range of 100 $s^{-1}$ or more becomes a value at which the applicability of the electrode mixture paste to the current collecting member becomes favorable.

On the other hand, in the method of producing an electrode mixture paste, after the kneading process, the ultrasonic wave application process is performed, and the viscosity of the electrode mixture paste in a low shear rate range in which the shear rate is 2.15 $s^{-1}$ or less is reduced. However, in the ultrasonic wave application process, when ultrasonic waves are applied to the electrode mixture paste while evaporation of the non-aqueous solvent from the electrode mixture paste is prevented, the solid content of the electrode mixture paste is prevented from changing. Thereby, the change in viscosity of the electrode mixture paste in a high shear rate range in which the shear rate is 100 $s^{-1}$ or more is minimized. Therefore, the electrode mixture paste can be appropriately applied to the surface of the current collecting member.

Therefore, according to the production method, it is possible to appropriately produce a non-aqueous secondary battery. Here, regarding a method of applying the electrode mixture paste to a surface of a current collecting member, a coating method (die coating method) using a known die coating device may be exemplified.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

Next, a method of producing an electrode mixture paste 132 according to an embodiment will be described. In the present embodiment, regarding the electrode mixture paste 132, a positive electrode mixture paste including an electrode active material 133, a conductive material 134, a binding material 135, a dispersant 136, and a non-aqueous solvent 137 is produced. Here, in the present embodiment, a positive electrode active material including metal oxide (for example, nickel manganese lithium cobalt oxide) particles is used as the electrode active material 133. In addition, acetylene black particles are used as the conductive material 134. In addition, polyvinylidene fluoride (PVdF) is used as the binding material 135. In addition, N-methylpyrrolidone (NMP) is used as the non-aqueous solvent 137. In addition, the dispersant 136 adsorbs to particles of the electrode active material 133 and particles of the conductive material 134 and thus the dispersant 136 has a function of improving slippage between the particles to which the dispersant 136 adsorbs.

Figure 1:
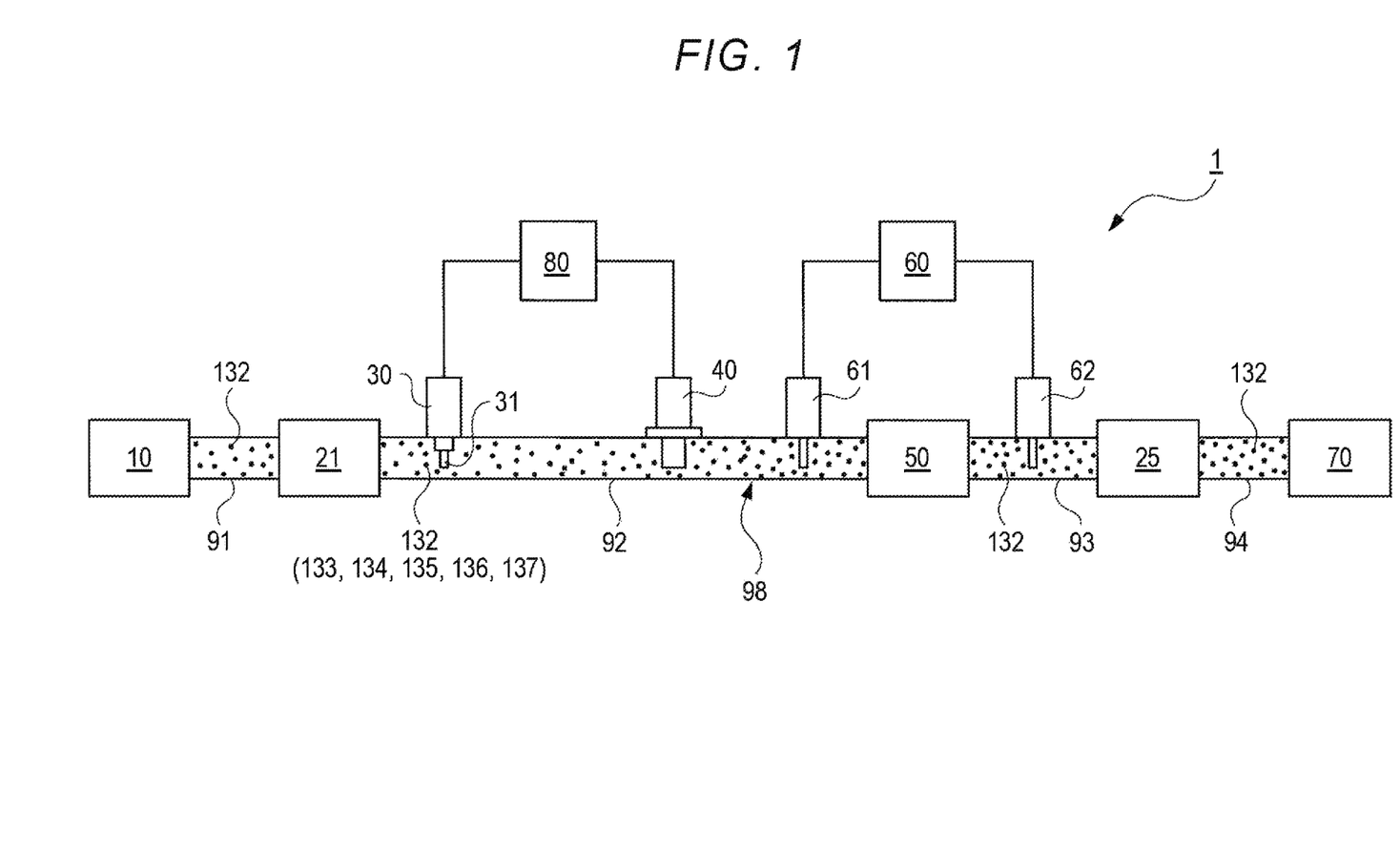
FIG. 1 is a schematic configuration diagram of an electrode mixture paste production device according to an embodiment.

Here, an electrode mixture paste production device 1 according to an embodiment will be described. As shown in FIG. 1, the production device 1 includes a kneading device 10, a first tank 21, a flow pipe 91 that connects the kneading device 10 to the first tank 21, an ultrasonic device 30, a viscometer 40, a first control unit 80, a first pressure gauge 61, a filter 50, a flow pipe 92 that connects the first tank 21 to the filter 50, a second pressure gauge 62, a second control unit 60, a second tank 25, and a flow pipe 93 that connects the filter 50 to the second tank 25. In addition, the second tank 25 is connected to a coating device 70 with a flow pipe 94 therebetween.

The kneading device 10 is composed of, for example, a known biaxial kneading device. The kneading device 10 is a device for kneading the electrode active material 133, the conductive material 134, the binding material 135, the dispersant 136, and the non-aqueous solvent 137 to produce the electrode mixture paste 132 (electrode mixture paste before ultrasonic waves are applied). The first tank 21 is a container in which the electrode mixture paste 132 (electrode mixture paste before ultrasonic waves are applied) produced by the kneading device 10 is temporarily stored. The flow pipe 91 is a pipe through which the electrode mixture paste 132 produced by the kneading device 10 (electrode mixture paste before ultrasonic waves are applied) is caused to flow to the first tank 21.

The filter 50 is a filter that removes foreign substances from the electrode mixture paste 132. Here, the filter 50 of the present embodiment has performance in which 90% or more of foreign substances having a size of 50 µm or more contained in the electrode mixture paste 132 can be collected. The flow pipe 92 is a pipe through which the electrode mixture paste 132 in the first tank 21 is caused to flow to the filter 50. Here, in the present embodiment, while the inside of the flow pipe 92 is filled with the electrode mixture paste 132 (in other words, while the electrode mixture paste 132 is allowed to remain in the flow pipe 92 without surplus space), the electrode mixture paste 132 is continuously supplied from the first tank 21 to the filter 50 through the flow pipe 92.

Here, in the production device 1 of the present embodiment, the electrode mixture paste 132 continuously flows from the upstream side (the side of the kneading device 10, the left side in FIG. 1) to the downstream side (the side of the second tank 25, the right side in FIG. 1) in a flow path 98 for the electrode mixture paste 132 composed of the flow pipes 91, 92, and 93.

In addition, the ultrasonic device 30 is provided in a mode in which a vibrator 31 is inserted into the flow pipe 92. The ultrasonic device 30 applies ultrasonic waves (that is, applies ultrasonic vibration) to the electrode mixture paste 132 that continuously flows from the first tank 21 to the filter 50 in the flow pipe 92. Here, in the present embodiment, an ultrasonic dispersing machine (UH-50) (commercially available from SMT Co., Ltd.) is used as the ultrasonic device 30. Here, the vibrator 31 of the ultrasonic device 30 is preferably arranged in the flow pipe 92 at a position as close to the filter 50 as possible.

Thus, when ultrasonic waves are applied to the electrode mixture paste 132, adsorption of the dispersant 136 on the electrode active material 133 (particles) and the conductive material 134 (particles) is promoted. Therefore, the viscosity of the electrode mixture paste 132 in a low shear rate range (low shear rate scope) in which the shear rate is $2.15 \text{ s}^{-1}$ or less can be reduced.

Moreover, while the inside of the flow pipe 92 is filled with the electrode mixture paste 132 (in other words, while the electrode mixture paste 132 is allowed to remain in the flow pipe 92 without surplus space), since ultrasonic waves are applied to the electrode mixture paste 132 in the flow pipe 92, it is possible to prevent evaporation of the non-aqueous solvent 137 from the electrode mixture paste 132. When evaporation of the non-aqueous solvent 137 from the electrode mixture paste 132 is prevented, it is possible to prevent the change in solid content of the electrode mixture paste 132. Therefore, it is possible to minimize the change in viscosity of the electrode mixture paste 132 in a high shear rate range in which the shear rate is $100 \text{ s}^{-1}$ or more.

The viscometer 40 is a known viscometer which measures the viscosity of the electrode mixture paste 132 that continuously flows from the first tank 21 to the filter 50 in the flow pipe 92. Specifically, the viscometer 40 measures the viscosity of the electrode mixture paste 132 after ultrasonic waves are applied (that is, ultrasonic vibration is applied).

In addition, the viscometer 40 of the present embodiment measures the viscosity of the electrode mixture paste 132 at a first shear rate in a shear rate range of $2.15 \text{ s}^{-1}$ or less (shear rate scope). Here, in the present embodiment, $2.15 \text{ s}^{-1}$ is selected as the first shear rate. Therefore, in the present embodiment, the viscometer 40 measures the viscosity of the electrode mixture paste 132 at a first shear rate (in the present embodiment, $2.15 \text{ s}^{-1}$) after ultrasonic waves are applied (that is, ultrasonic vibration is applied).

The control unit 80 compares the value of the viscosity of the electrode mixture paste 132 measured by the viscometer 40 (referred to as a viscosity measurement value) with a preset viscosity threshold value Th and determines whether the viscosity measurement value is larger than the threshold value Th. In addition, when it is determined that the viscosity measurement value is larger than the threshold value Th, the first control unit 80 performs control such that the set value of the frequency of ultrasonic waves generated by the ultrasonic device 30 is changed to a value larger than the currently set frequency value. Therefore, thereafter, the ultrasonic device 30 can apply ultrasonic waves having a changed frequency to the electrode mixture paste 132 that continuously flows from the first tank 21 to the filter 50 in the flow pipe 92. Accordingly, the viscosity (mPa·s) of the electrode mixture paste 132 at a first shear rate (in the present embodiment, $2.15 \text{ s}^{-1}$) can be adjusted to the threshold value Th or less.

Here, the threshold value Th is preferably set to a value at which it is possible to effectively minimize clogging of the filter 50. In the present embodiment, since $2.15 \text{ s}^{-1}$ is selected as the first shear rate (that is, the viscosity at a shear rate of $2.15 \text{ s}^{-1}$ is measured), the threshold value Th is set to 15,000 (mPa·s). Therefore, the viscosity of the electrode mixture paste 132 that continuously flows in the flow pipe 92, at a shear rate of $2.15 \text{ s}^{-1}$, can be adjusted to 15,000 (mPa·s) or less before the electrode mixture paste 132 reaches the filter 50.

The first pressure gauge 61 is a known pressure gauge which is mounted at the flow pipe 92 at a position close to the filter 50. Specifically, the first pressure gauge 61 is arranged upstream from the filter 50 along the flow path 98 for the electrode mixture paste 132 composed of the flow pipes 91, 92, and 93. The first pressure gauge 61 measures the pressure of the electrode mixture paste 132 immediately before it passes through the filter 50.

The second pressure gauge 62 is a known pressure gauge which is mounted at the flow pipe 93 at a position close to the filter 50. Specifically, the second pressure gauge 62 is arranged downstream from the filter 50 along the flow path 98 for the electrode mixture paste 132 composed of the flow pipes 91, 92, and 93. The second pressure gauge 62 measures the pressure of the electrode mixture paste 132 immediately after it passes through the filter 50.

The second control unit 60 inputs a pressure value measured by the first pressure gauge 61 (referred to as a first pressure value P1) and a pressure value measured by the second pressure gauge 62 (referred to as a second pressure value P2) and calculates a differential pressure ΔP (pressure loss) of the filter 50=(first pressure value P1−second pressure value P2).

The second tank 25 is a container in which the electrode mixture paste 132 filtered through the filter 50 (from which foreign substances are removed) is temporarily stored. The electrode mixture paste 132 filtered through the filter 50 (from which foreign substances are removed) is accommodated in the second tank 25 through the flow pipe 93.

Figure 9:
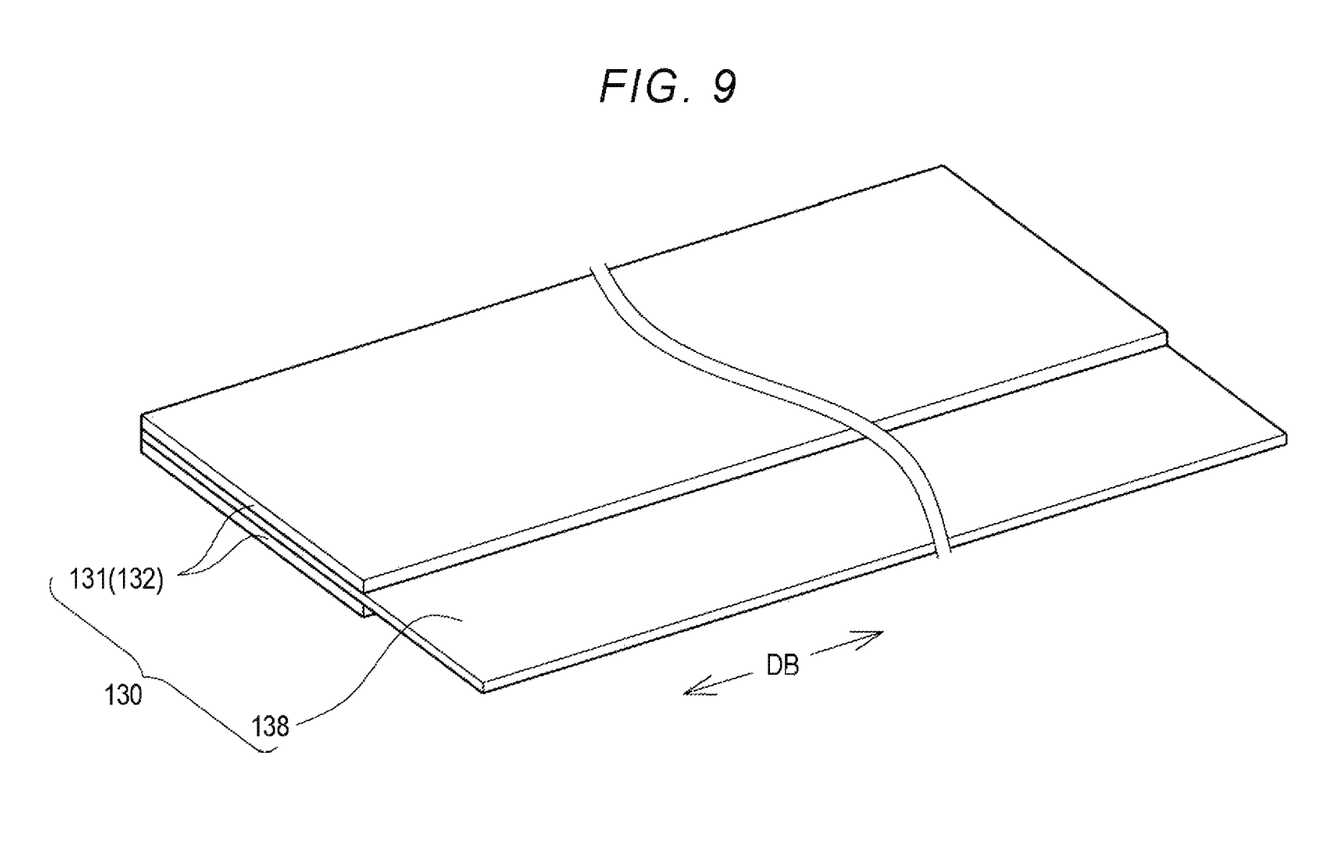
FIG. 9 is a schematic diagram of a positive electrode according to an embodiment.

The coating device 70 is a known die coating device, and a device that applies the electrode mixture paste 132 to a surface of a current collecting member (in the present embodiment, a positive electrode current collecting foil 138). The electrode mixture paste 132 accommodated in the second tank 25 is supplied to the coating device 70 through the flow pipe 94 and applied to a surface of a current collecting member (the positive electrode current collecting foil 138) (refer to FIG. 9).

Figure 2:
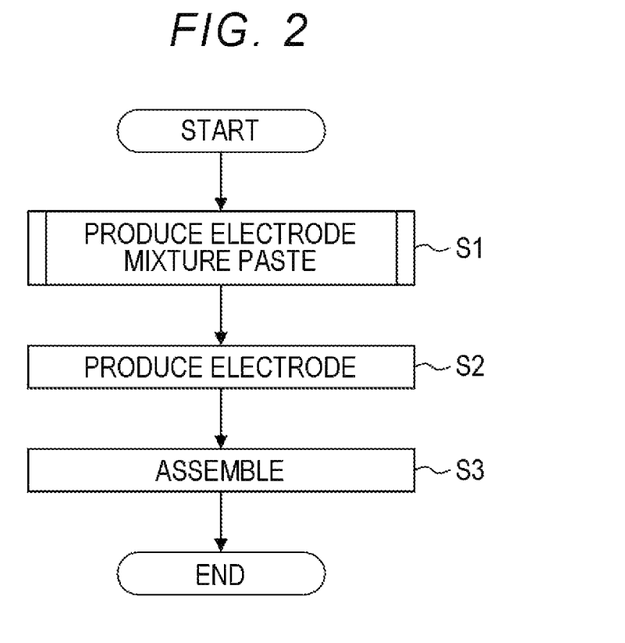
FIG. 2 is a flowchart showing a flow of a method of producing a non-aqueous secondary battery according to an embodiment.
Figure 3:
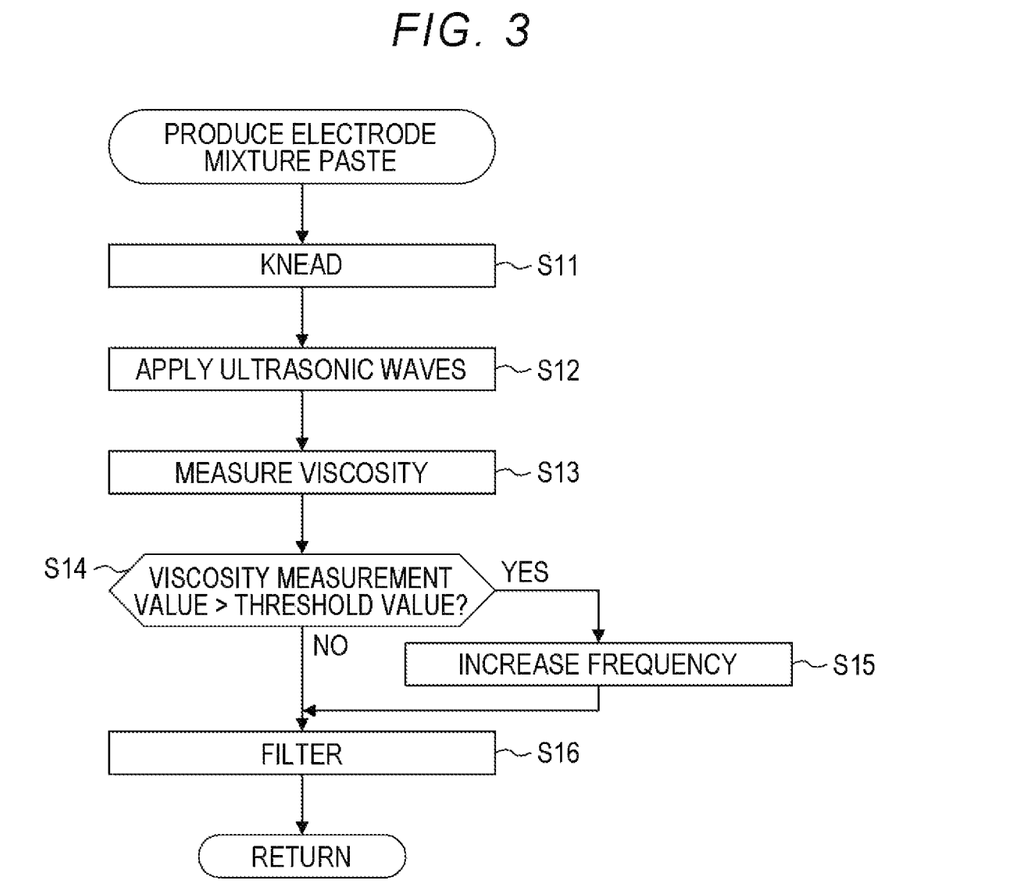
FIG. 3 is a flowchart showing a flow of a method of producing an electrode mixture paste according to an embodiment.

Next, a method of producing an electrode mixture paste and a method of producing a non-aqueous secondary battery according to the present embodiment will be described. FIG. 2 is a flowchart showing a flow of a method of producing a non-aqueous secondary battery according to an embodiment. FIG. 3 is a flowchart showing a flow of a method of producing an electrode mixture paste according to an embodiment.

As shown in FIG. 2, in Step S1 (electrode mixture paste producing process), the electrode mixture paste 132 is produced. Specifically, as shown in FIG. 3, first, in Step S11 (kneading process), using the kneading device 10, the electrode active material 133, the conductive material 134, the binding material 135, the dispersant 136, and the non-aqueous solvent 137 are kneaded to produce the electrode mixture paste 132 (electrode mixture paste before ultrasonic waves are applied). The produced electrode mixture paste 132 is supplied into the first tank 21 through the flow pipe 91 and temporarily stored in the first tank 21 (refer to FIG. 1).

Next, the process proceeds to Step S12 (ultrasonic wave application process), and the ultrasonic device 30 applies ultrasonic waves (that is, applies ultrasonic vibration) to the electrode mixture paste 132 that continuously flows from the first tank 21 to the filter 50 in the flow pipe 92. Specifically, when the electrode mixture paste 132 that continuously flows from the first tank 21 to the filter 50 in the flow pipe 92 passes near the vibrator 31 of the ultrasonic device 30, ultrasonic waves are applied (that is, ultrasonic vibration is applied) to the electrode mixture paste 132.

In this manner, when ultrasonic waves are applied to the electrode mixture paste 132, adsorption of the dispersant 136 to the electrode active material 133 (particles) and the conductive material 134 (particles) is promoted. Therefore, the viscosity of the electrode mixture paste 132 in a low shear rate range (low shear rate scope) in which the shear rate is $2.15\ s^{-1}$ or less can be reduced.

Moreover, while the inside of the flow pipe 92 is filled with the electrode mixture paste 132 (in other words, while the electrode mixture paste 132 is allowed to remain in the flow pipe 92 without surplus space), since ultrasonic waves are applied to the electrode mixture paste 132 in the flow pipe 92, it is possible to prevent evaporation of the non-aqueous solvent 137 from the electrode mixture paste 132. Therefore, in Step S12 (ultrasonic wave application process) of the present embodiment, ultrasonic waves can be applied to the electrode mixture paste 132 while evaporation of the non-aqueous solvent 137 from the electrode mixture paste 132 is prevented. In this manner, when evaporation of the non-aqueous solvent 137 from the electrode mixture paste 132 is prevented, it is possible to prevent the change in solid content of the electrode mixture paste 132. Therefore, it is possible to minimize the change in viscosity of the electrode mixture paste 132 in a high shear rate range in which the shear rate is $100\ s^{-1}$ or more.

Next, the process proceeds to Step S13 (viscosity measurement process), and the viscosity of the electrode mixture paste 132 that continuously flows toward the filter 50 in the flow pipe 92 is measured. Specifically, the viscometer 40 measures the viscosity of the electrode mixture paste 132 after ultrasonic waves are applied (after the ultrasonic wave application process) and before the paste passes through the filter 50 (after the filtering process to be described below) at a first shear rate selected from a shear rate range of $2.15\ s^{-1}$ or less (shear rate scope). Here, in the present embodiment, $2.15\ s^{-1}$ is selected as the first shear rate. Therefore, in the present embodiment, the viscometer 40 measures the viscosity of the electrode mixture paste 132 at a shear rate of $2.15\ s^{-1}$.

Next, in Step S14 (viscosity determining process), the first control unit 80 compares a viscosity value of the electrode mixture paste 132 measured by the viscometer 40 (referred to as a viscosity measurement value) with a preset viscosity threshold value Th, and determines whether the viscosity measurement value is larger than the threshold value Th. Here, in the present embodiment, the threshold value Th is set to 15,000 (mPa·s).

In Step S14, when it is determined whether the viscosity measurement value is larger than the threshold value Th (YES), the process proceeds to Step S15 (frequency changing process), and the first control unit 80 performs control such that the set value of the frequency of ultrasonic waves generated by the ultrasonic device 30 is changed to a value larger than the currently set frequency value. For example, when the set value of the frequency of ultrasonic waves generated by the ultrasonic device 30 is currently 20 kHz, the set value of the frequency is changed to a value larger than 20 kHz (for example, 25 kHz).

Therefore, thereafter, the ultrasonic device 30 can apply ultrasonic waves having a changed frequency to the electrode mixture paste 132 that continuously flows from the first tank 21 to the filter 50 in the flow pipe 92. Accordingly, the viscosity (mPa·s) of the electrode mixture paste 132 at a first shear rate (in the present embodiment, $2.15\ s^{-1}$) can be adjusted to the threshold value Th (in the present embodiment, 15,000 mPa·s) or less.

On the other hand, in Step S14, when it is determined that the viscosity measurement value is the threshold value Th or less (NO), the process of Step S15 is not performed, and the process proceeds to Step S16 (filtering process). In addition, in Step S14, when it is determined that the viscosity measurement value is larger than the threshold value Th (YES), the process advances to Step S16 (filtering process) after the process of Step S15 is performed.

Next, in Step S16 (filtering process), the electrode mixture paste 132 that has been subjected to the process such as Step S12 (ultrasonic wave application process) passes through the filter 50, and foreign substances contained in the electrode mixture paste 132 are removed from the electrode mixture paste 132. Specifically, the electrode mixture paste 132 that continuously flows in the flow pipe 92 is continuously supplied into the filter 50 and passes through the filter 50, and thus foreign substances contained in the electrode mixture paste 132 are removed. Specifically, when the electrode mixture paste 132 passes through the filter 50, 90% or more of foreign substances having a size of 50 μm or more contained in the electrode mixture paste 132 are collected.

Incidentally, in the related art, a filtering process in which the electrode mixture paste obtained by performing the kneading process passes through a filter and foreign substances contained in the electrode mixture paste are removed from the electrode mixture paste has been performed. However, since the electrode mixture paste obtained by performing the kneading process has a high viscosity in a low shear rate range in which the shear rate is $2.15\ s^{-1}$ or less, a part of the filter is clogged quickly, and it is necessary to replace the filter soon in some cases. Specifically, for example, due to a rush phenomenon, in a mode in which a cake layer formed of an electrode mixture paste is formed on the surface of the filter, and thereby a part of the filter is blocked, the filter is partially clogged.

On the other hand, in the present embodiment, the filtering process (Step S16) is provided after the ultrasonic wave application process (Step S12). Therefore, the electrode mixture paste 132 obtained by performing the kneading process (Step S11) is subjected to the ultrasonic wave application process (Step S12) before it passes through the filter 50 (that is, before the filtering process is performed). As described above, when the ultrasonic wave application process (Step S12) is performed, the viscosity of the electrode mixture paste 132 in a low shear rate range of 2.15 $s^{-1}$ or less can be reduced. Therefore, in the production method of the present embodiment, before the filtering process (Step S16) is performed, the viscosity of the electrode mixture paste 132 in a low shear rate range of 2.15 $s^{-1}$ or less can be reduced.

In this manner, when the viscosity of the electrode mixture paste 132 in a low shear rate range of 2.15 $s^{-1}$ or less is reduced, clogging of the filter 50 due to the electrode mixture paste 132 is unlikely to occur. Specifically, when the viscosity of the electrode mixture paste 132 in a low shear rate range of 2.15 $s^{-1}$ or less is reduced, for example, a cake layer formed of the electrode mixture paste 132 is unlikely to be formed on the surface of the filter 50. Therefore, it is possible to reduce a rising rate (rising speed) of a differential pressure of the filter 50 and increase the lifespan of the filter 50. The electrode mixture paste 132 filtered through the filter 50 (from which foreign substances are removed) is accommodated in the second tank 25 through the flow pipe 93 (refer to FIG. 1).

Figure 6:
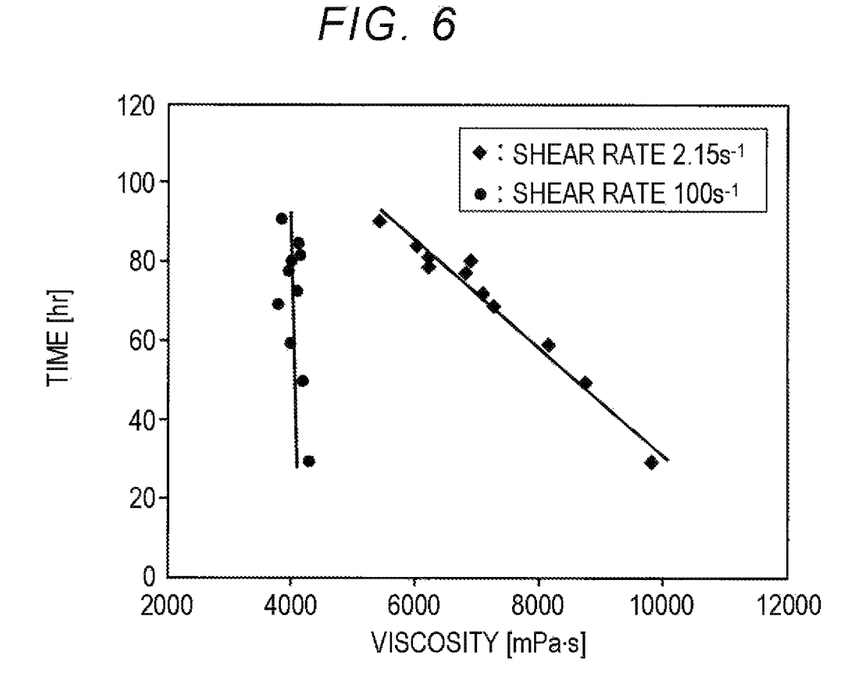
FIG. 6 is a comparison diagram showing the relationship between a viscosity of an electrode mixture paste and a time in which a filter differential pressure reaches a predetermined value.

FIG. 6 is a comparison diagram showing the relationship between the viscosity of the electrode mixture paste 132 and a time in which the differential pressure of the filter 50 reaches a predetermined value. Here, FIG. 6 is created as follows. Specifically, in the ultrasonic wave application process (Step S12), a plurality of types of electrode mixture pastes 132 obtained by applying ultrasonic waves having different frequencies to the electrode mixture paste 132 and having different viscosities in a low shear rate range of 2.15 $s^{-1}$ or less while the change in viscosity in a high shear rate range of 100 $s^{-1}$ or more is minimized are caused to continuously pass through the filter 50. Then, a differential pressure of the filter 50 is measured while continuously passing the electrode mixture pastes 132 having different viscosities through the new filter 50, and a time from when measurement starts until the differential pressure of the filter 50 reaches a predetermined value is obtained. Here, the viscosity of the electrode mixture pastes 132 before passing through the filter 50 at a shear rate of 100 $s^{-1}$ is measured as a viscosity in a high shear rate range, and a viscosity at a shear rate of 2.15 $s^{-1}$ is measured as a viscosity in a low shear rate range. These results are shown in FIG. 6.

As shown in FIG. 6, the electrode mixture pastes 132 have almost the same viscosity at a shear rate of 100 $s^{-1}$ but have different viscosities at a shear rate of 2.15 $s^{-1}$. In addition, the electrode mixture pastes 132 have different times until the differential pressure of the new filter 50 reaches a predetermined value. Specifically, in FIG. 6, it can be understood that a time in which the differential pressure of the filter 50 reaches a predetermined value is longer as the viscosity at a shear rate of 2.15 $s^{-1}$ decreases. Therefore, it can be said that, when the viscosity of the electrode mixture paste 132 in a low shear rate range of 2.15 $s^{-1}$ or less decreases, clogging of the filter 50 due to the electrode mixture paste 132 is unlikely to occur (the differential pressure of the filter 50 is unlikely to increase).

Returning to the flowchart in FIG. 2, in Step S2 (electrode producing process), the positive electrode 130 (refer to FIG. 9) is produced as an electrode. Specifically, first, the electrode mixture paste 132 (positive electrode mixture paste) produced in Step S1 is applied to the surface (both surfaces) of the positive electrode current collecting foil 138 formed of an aluminum foil. Specifically, the electrode mixture paste 132 accommodated in the second tank 25 is supplied to the coating device 70 through the flow pipe 94, and applied to the surface of the current collecting member (the positive electrode current collecting foil 138). Next, the electrode mixture paste 132 applied to the surface (both surfaces) of the positive electrode current collecting foil 138 is dried. Then, the dried electrode mixture paste 132 is compressed and molded by a roll press. Therefore, the positive electrode 130 (refer to FIG. 9) in which a positive electrode mixture layer 131 is laminated on the surface (both surfaces) of the positive electrode current collecting foil 138 is completed.

Incidentally, when the coating device 70 applies the electrode mixture paste 132 to the surface of the current collecting member (the positive electrode current collecting foil 138), a shear force at a high shear rate of 100 $s^{-1}$ or more is applied to the electrode mixture paste 132. Therefore, the viscosity of the electrode mixture paste 132 in a high shear rate range of 100 $s^{-1}$ or more affects the applicability of the electrode mixture paste 132 to the current collecting member (the positive electrode current collecting foil 138). Therefore, in the kneading process (Step S11) of the present embodiment, kneading is performed so that the viscosity of the electrode mixture paste 132 at a shear rate in a high shear rate range of 100 $s^{-1}$ or more becomes a value at which the applicability of the electrode mixture paste 132 to the current collecting member becomes favorable.

On the other hand, in the present embodiment, after the kneading process (Step S11), the ultrasonic wave application process (Step S12) is performed and the viscosity of the electrode mixture paste 132 in a low shear rate range in which the shear rate is 2.15 $s^{-1}$ or less is reduced. However, in the ultrasonic wave application process, when ultrasonic waves are applied to the electrode mixture paste 132 while evaporation of the non-aqueous solvent 137 from the electrode mixture paste 132 is prevented, the solid content of the electrode mixture paste 132 is prevented from changing. Therefore, the change in viscosity of the electrode mixture paste 132 in a high shear rate range in which the shear rate is 100 $s^{-1}$ or more is minimized. Therefore, the coating device 70 can appropriately apply the electrode mixture paste 132 to the surface of the current collecting member (the positive electrode current collecting foil 138).

Figure 10:
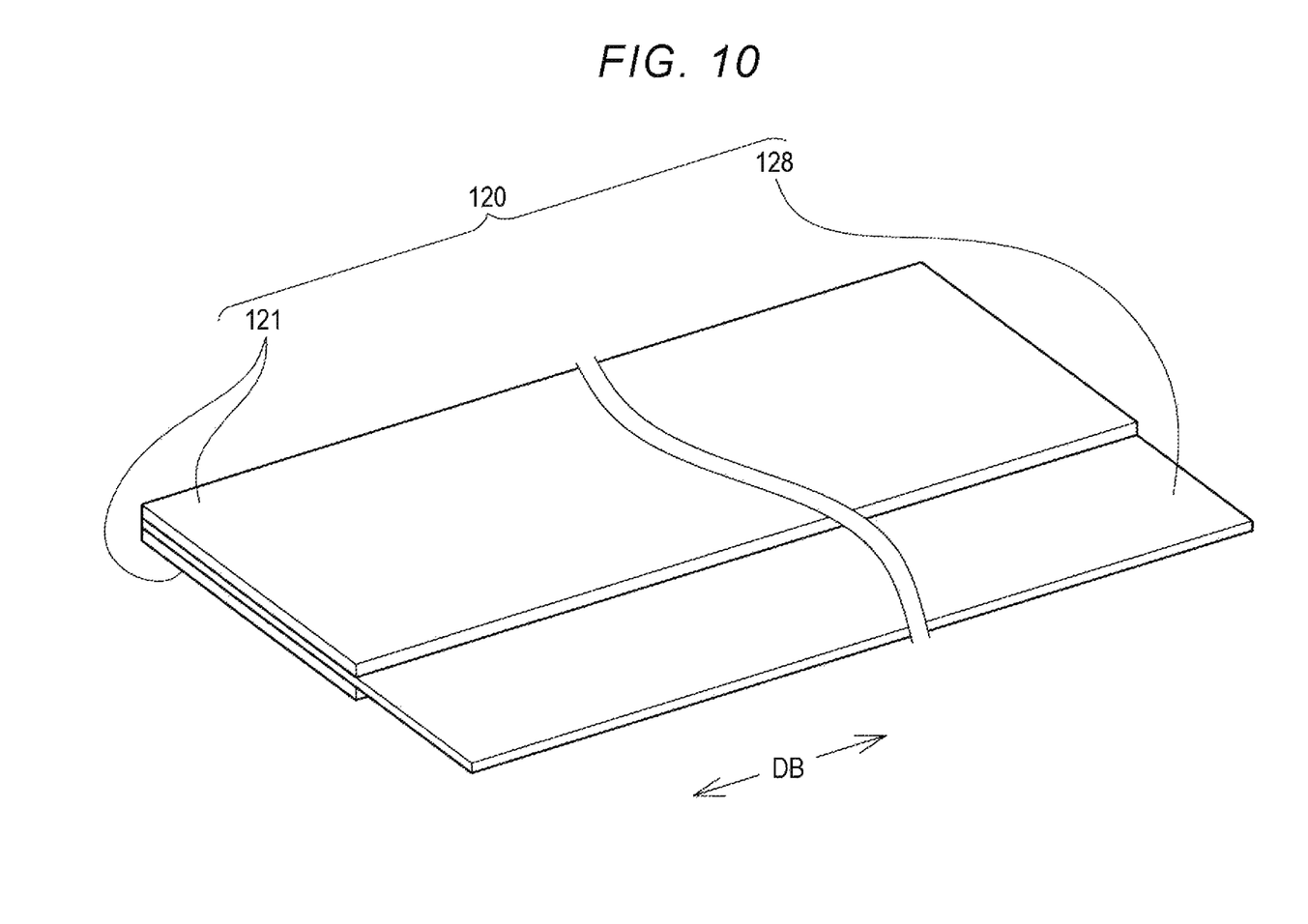
FIG. 10 is a schematic diagram of a negative electrode according to an embodiment.

In addition, separately, a negative electrode 120 is produced. Specifically, a negative electrode active material, a binding material, and a solvent are kneaded to produce a negative electrode mixture paste. Then, the negative electrode mixture paste is applied to the surface (both surfaces) of a negative electrode current collecting foil 128 formed of a copper foil and dried and then compressed and molded by a roll press. Therefore, the negative electrode 120 (refer to FIG. 10) in which a negative electrode mixture layer 121 is laminated on the surface (both surfaces) of the negative electrode current collecting foil 128 is completed.

Figure 8:
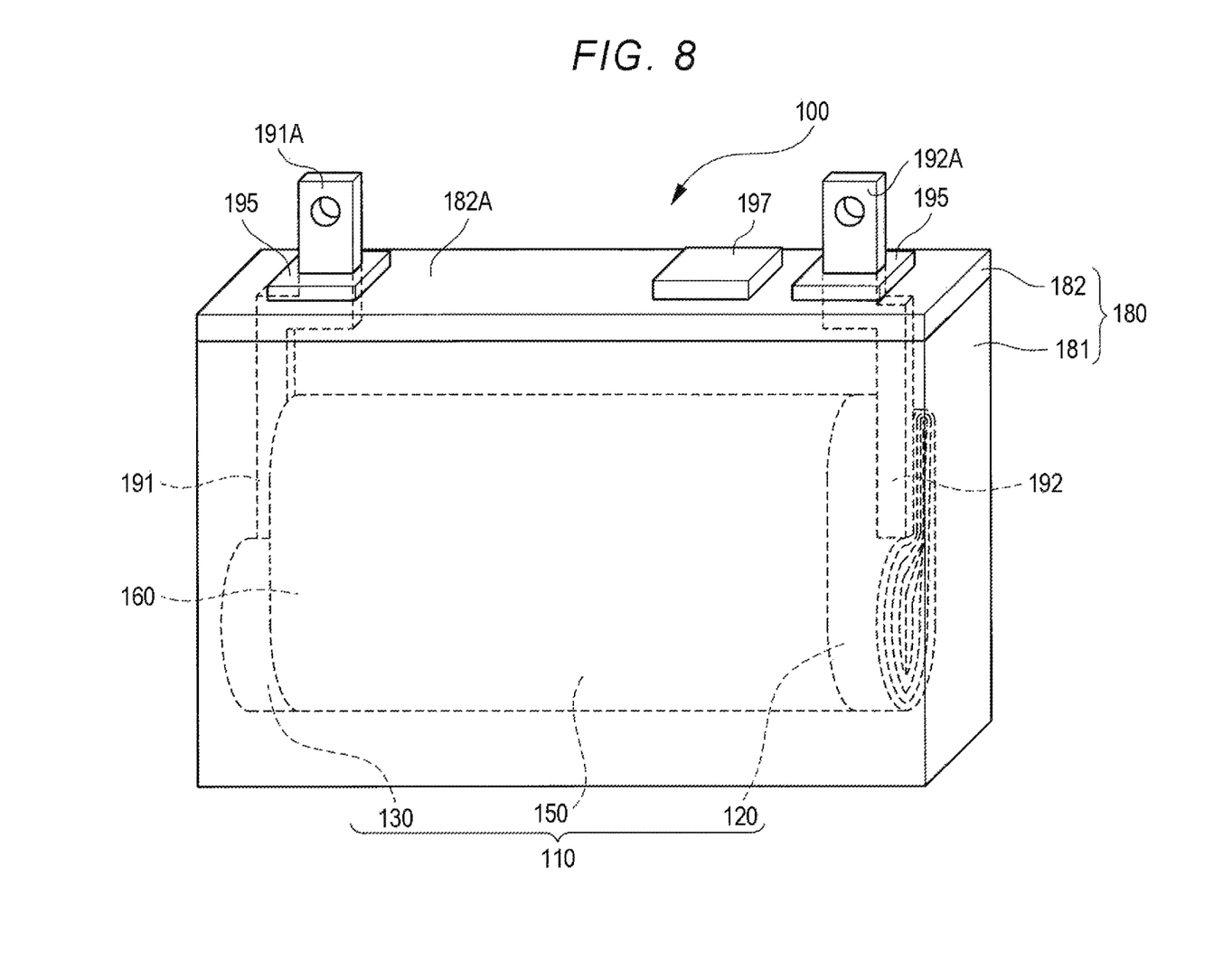
FIG. 8 is a schematic diagram of a non-aqueous secondary battery according to an embodiment.

Next, a separator 150 is interposed between the positive electrode 130 and the negative electrode 120, and these are wound to produce a flat wound electrode body 110 (refer to FIG. 8). Then, a negative electrode current collecting member 192 is welded to the negative electrode 120 (the negative electrode current collecting foil 128), and a positive electrode current collecting member 191 is welded to the positive electrode 130 (the positive electrode current collecting foil 138). Here, before this welding is performed, the positive electrode current collecting member 191 and the negative electrode current collecting member 192 are assembled to a sealing lid 182 and these are integrated.

Next, the process proceeds to Step S3 (assembling process), and a non-aqueous secondary battery 100 is assembled. Specifically, the electrode body 110 in which the negative electrode current collecting member 192 and the positive electrode current collecting member 191 are welded is accommodated in a battery case main body 181. In this case, the opening of the battery case main body 181 is blocked with the sealing lid 182. Then, the sealing lid 182 and the battery case main body 181 are welded to form a battery case 180. Then, a non-aqueous electrolytic solution 160 is injected into the battery case 180 through an injection hole (not shown). Then, a predetermined process (initial charging or the like) is performed and thus the non-aqueous secondary battery 100 is completed.

Here, a method in which a series of processes including Steps S11 to S16 are performed as Step S1 (electrode mixture paste producing process) is exemplified, but in Step S1, the electrode mixture paste 132 may be produced without performing processes of Steps S13 to S15. That is, in Step S12 (ultrasonic wave application process), the frequency of ultrasonic waves applied to the electrode mixture paste 132 is fixed, and processes of Steps S11, S12, and S16 may be performed as Step S1 (electrode mixture paste producing process) to produce the electrode mixture paste 132.

EXAMPLE 1 AND COMPARATIVE EXAMPLE 1

In Example 1, regarding the electrode mixture paste producing process, processes of Steps S11 to S16 (where, processes of Steps S13 to S15 are not performed) were performed to continuously produce the electrode mixture paste 132. In Example 1, in Step S12 (ultrasonic wave application process), the frequency of ultrasonic waves applied to the electrode mixture paste 132 was fixed to 20 kHz, and ultrasonic waves were applied to the electrode mixture paste 132 of Comparative Example 1 produced in the kneading process. That is, ultrasonic waves having a frequency of 20 kHz were applied to the electrode mixture paste 132 while evaporation of the non-aqueous solvent 137 from the electrode mixture paste 132 is prevented. Then, the viscosities of the electrode mixture paste 132 at various shear rates after ultrasonic waves were applied (before Step S16 was performed) were measured. The results are shown in FIG. 4.

On the other hand, in Comparative Example 1, only processes of Step S11 (kneading process) and Step S16 (filtering process) were performed as the electrode mixture paste producing process to continuously produce the electrode mixture paste 132. In Comparative Example 1, the viscosities of the electrode mixture paste 132 at various shear rates produced in Step S11 (before Step S16 was performed) were measured. The results are shown in FIG. 4.

Figure 4:
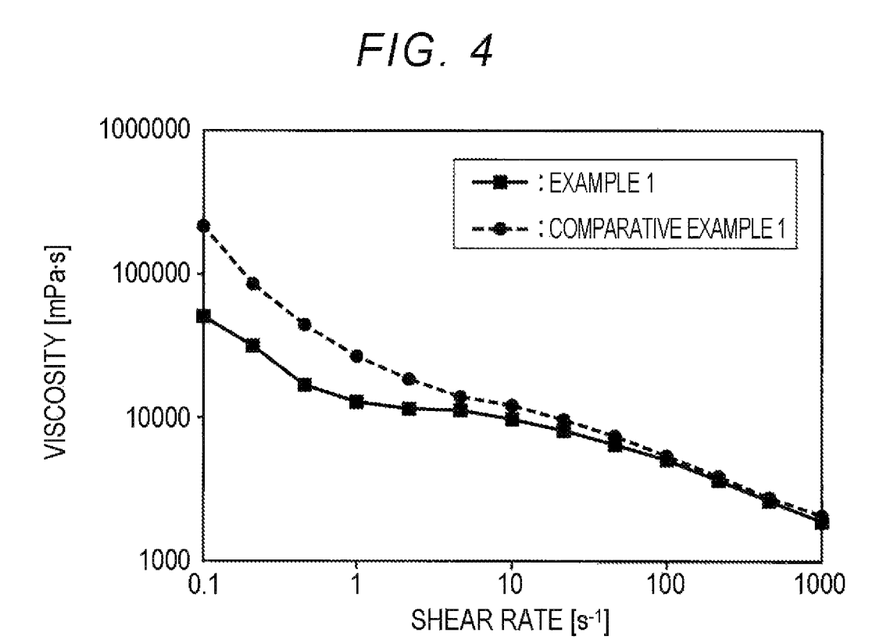
FIG. 4 is a comparison diagram showing the relationship between a shear rate and a viscosity of an electrode mixture paste.

As shown in FIG. 4, it can be understood that the electrode mixture paste 132 of Example 1 had a viscosity in a low shear rate range of 2.15 $s^{-1}$ or less that was significantly lower than that of the electrode mixture paste 132 of Comparative Example 1. On the other hand, it can be understood that there was almost no difference in viscosity in a high shear rate range of 100 $s^{-1}$ or more between the electrode mixture paste 132 of Example 1 and the electrode mixture paste 132 of Comparative Example 1. Based on the results, it can be said that, when ultrasonic waves were applied to the electrode mixture paste 132 while evaporation of the non-aqueous solvent 137 from the electrode mixture paste 132 is prevented, it was possible to reduce the viscosity in a low shear rate range in which the shear rate is 2.15 $s^{-1}$ or less while the change in viscosity of the electrode mixture paste 132 in a high shear rate range in which the shear rate was 100 $s^{-1}$ or more is minimized.

In addition, in Example 1, the differential pressure of the filter 50 was measured when Step S16 (filtering process) was performed. Specifically, the differential pressure of the filter 50 was measured after the new filter 50 was provided and the process of Step S16 (filtering process) started. In addition, in Comparative Example 1, the differential pressure of the filter 50 was measured when Step S16 (filtering process) was performed. Specifically, as in Example 1, the differential pressure of the filter 50 was measured after the new filter 50 was provided and the process of Step S16 (filtering process) started. These results are shown in FIG. 5.

Figure 5:
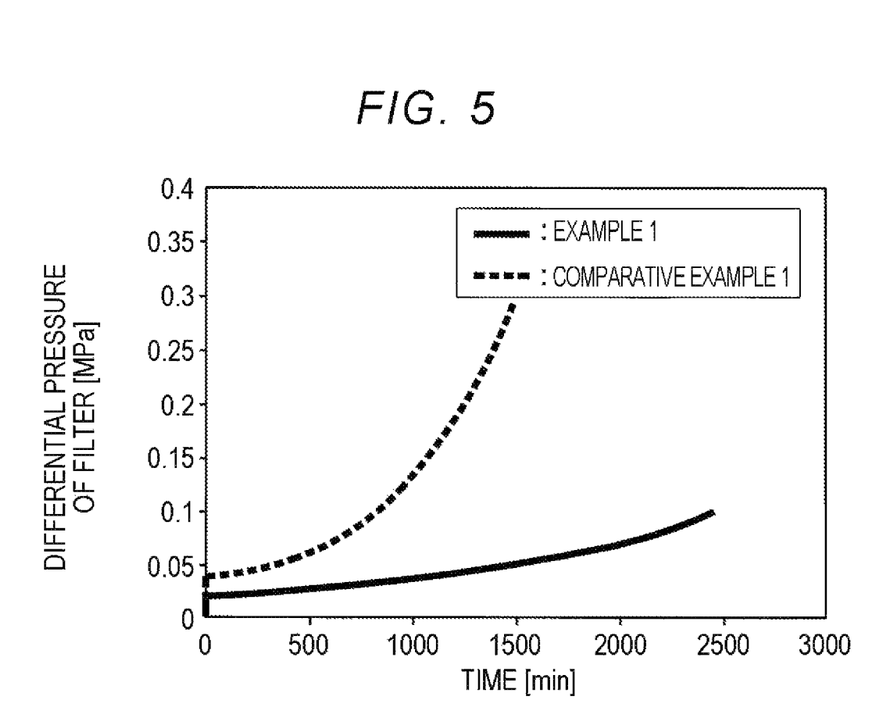
FIG. 5 is a comparison diagram showing the relationship between a filter use time and a filter differential pressure.

As shown in FIG. 5, a rising rate (MPa/min) of the differential pressure of the filter 50 in Example 1 was significantly lower than in Comparative Example 1. That is, in the production method in Example 1, compared to the production method of Comparative Example 1, clogging of the filter 50 due to the electrode mixture paste 132 was unlikely to occur. The production method of Example 1 was different from the production method of Comparative Example 1 only in that the process of Step S12 (ultrasonic wave application process) was added. Then, the process of Step S12 (ultrasonic wave application process) was performed and thus the viscosity of the electrode mixture paste 132 in a low shear rate range in which the shear rate is 2.15 $s^{-1}$ or less was reduced.

Based on the results, the ultrasonic wave application process was performed on the electrode mixture paste 132 produced in the kneading process and it was possible to reduce the viscosity in a low shear rate range in which the shear rate is 2.15 $s^{-1}$ or less. Therefore, it can be said that clogging of the filter 50 due to the electrode mixture paste 132 was unlikely to occur, and it was possible to increase the lifespan of the filter 50.

COMPARATIVE EXAMPLE 2

In Comparative Example 2, the amount of the conductive material 134 added in Step S11 (kneading process) was set to be smaller than that of Comparative Example 1, and thus the electrode mixture paste 132 having a viscosity in a low shear rate range of 2.15 $s^{-1}$ or less, which was almost the same as that of Example 1, was produced. As in the electrode mixture paste 132 of Comparative Example 1, the viscosities of the electrode mixture paste 132 of Comparative Example 2 at various shear rates were measured. The results are shown in FIG. 7 together with the viscosity of the electrode mixture paste 132 of Comparative Example 1.

Figure 7:
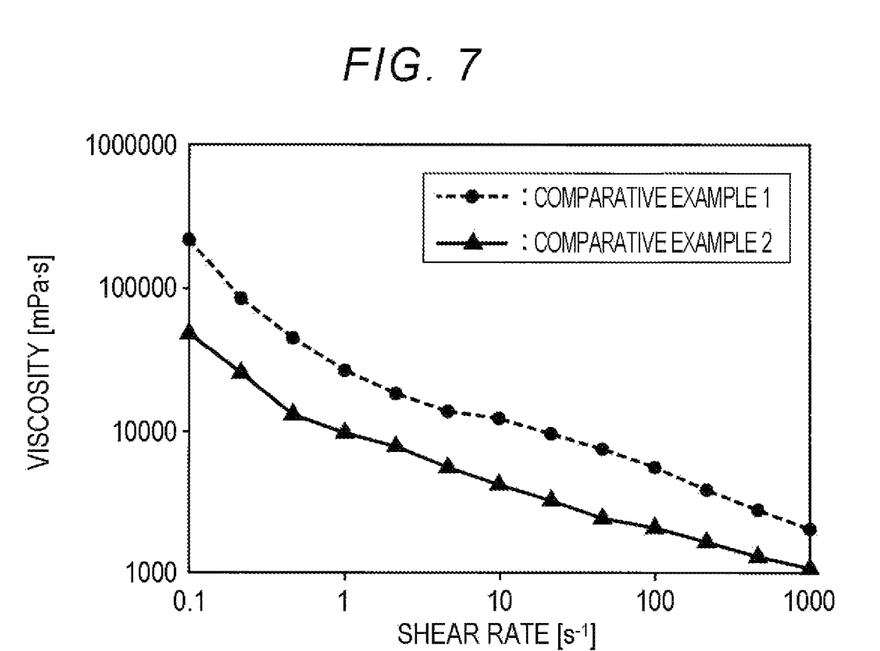
FIG. 7 is a comparison diagram showing the relationship between a shear rate and a viscosity of an electrode mixture paste.

As shown in FIG. 7, the viscosity at each shear rate of the electrode mixture paste 132 of Comparative Example 2 was generally lower than that of the electrode mixture paste 132 of Comparative Example 1. That is, in Comparative Example 2, not only the viscosity in a low shear rate range in which the shear rate is 2.15 $s^{-1}$ or less but also the viscosity in a high shear rate range in which the shear rate was 100 $s^{-1}$ or more were significantly lower compared to Comparative Example 1. Therefore, the coating device 70 was not able to appropriately apply the electrode mixture paste 132 of Comparative Example 2 to the surface of the current collecting member (the positive electrode current collecting foil 138). Moreover, in the electrode mixture paste 132 of Comparative Example 2, since the amount of the conductive material 134 added was reduced, in the positive electrode 130 produced using the same, the conductivity of the electrode mixture layer (the positive electrode mixture layer 131) was reduced and the battery performance deteriorated.

While the present disclosure have been described above with reference to embodiments, it is needless to say that the present disclosure is not limited to the above embodiment, and appropriate modifications can be applied without departing from the spirit and scope of the disclosure.

For example, in the embodiments, the electrode mixture paste 132 produced by the kneading device 10 was temporarily stored in the first tank 21. However, the first tank 21 is not provided, the kneading device 10 for performing a kneading process and the filter 50 for performing a filtering process are directly connected by the flow pipe 92, and while the inside of the flow pipe 92 is filled with the electrode mixture paste 132 subjected to the kneading process (in other words, while the electrode mixture paste 132 subjected to the kneading process is allowed to remain in the flow pipe 92 without surplus space), the electrode mixture paste 132 may be caused to continuously flow from the kneading device 10 to the filter 50 through the flow pipe 92.

What is claimed is:

1. A method of producing an electrode mixture paste, comprising:
    a kneading process in which an electrode active material, a conductive material, a binding material, a dispersant and a non-aqueous solvent are kneaded to obtain an electrode mixture paste; and
    an ultrasonic wave application process in which ultrasonic waves are applied to the electrode mixture paste in a flow pipe containing the electrode mixture paste without surplus space and without evaporating the non-aqueous solvent from the electrode mixture paste;
    a filtering process in which foreign substances contained in the electrode mixture paste are removed when the electrode mixture paste passes through a filter after the ultrasonic wave application process, the filter configured to remove 90% or more of foreign substances in the electrode paste having a size of 50 µm or more;
    wherein, while the inside of the flow pipe that connects a kneading device for performing the kneading process or a tank in which the electrode mixture paste obtained by the kneading using the kneading device to the filter for performing the filtering process is filled with the electrode mixture paste, the electrode mixture paste is caused to flow continuously from the kneading device or the tank to the filter through the flow pipe directly to the filter, and
    wherein, in the ultrasonic wave application process, ultrasonic waves are applied to the electrode mixture paste in the flow pipe before the electrode mixture paste reaches the filter and at a location closer to the filter than the kneading device;
    a viscosity measurement process in which the viscosity of the electrode mixture paste that continuously flows to the filter in the flow pipe is measured at a first shear rate in a shear rate range of 2.15 s$^{-1}$ or less after the ultrasonic wave application process and before the filtering process, and a threshold value of 15,000 (mPa·s)
    wherein, when a value of the viscosity measured in the viscosity measurement process is larger than a preset threshold value, a value of a frequency of the ultrasonic waves applied in the ultrasonic wave application process is increased and the ultrasonic wave application process is performed.

2. A method of producing a non-aqueous secondary battery, comprising:
    a process in which the electrode mixture paste produced by the method of producing an electrode mixture paste according to claim 1 is applied to a surface of a current collecting member and dried to obtain an electrode; and
    a process in which the electrode is accommodated in a battery case to obtain the non-aqueous secondary battery.

3. A method of producing an electrode mixture paste, comprising:
    a kneading process in which an electrode active material, a conductive material, a binding material, a dispersant and a non-aqueous solvent are kneaded to obtain an electrode mixture paste; and
    an ultrasonic wave application process in which ultrasonic waves are applied to the electrode mixture paste in a flow pipe containing the electrode mixture paste without surplus space and without evaporating the non-aqueous solvent from the electrode mixture paste;
    a filtering process in which foreign substances contained in the electrode mixture paste are removed from the electrode mixture paste passing through a filter after the ultrasonic wave application process, the filter configured to remove 90% or more of foreign substances in the electrode paste having a size of 50 µm or more;
    wherein, while the inside of the flow pipe that connects a tank in which the electrode mixture paste obtained by the kneading process using a kneading device directly to the first filter for performing the filtering process is filled with the electrode mixture paste, the electrode mixture paste is caused to continuously flow from the tank to the first filter through the flow pipe, and wherein, in the ultrasonic wave application process, ultrasonic waves are applied to the electrode mixture paste in the flow pipe between the electrode mixture paste and the first filter at a location closer to the filter than the kneading device;
    a viscosity measurement process in which the viscosity of the electrode mixture paste that continuously flows to the filter in the flow pipe is measured at a first shear rate in a shear rate range of 2.15 s$^{-1}$ or less after the ultrasonic wave application process and before the filtering process, and a threshold value of 15,000 (mPa·s)
    wherein, when a value of the viscosity measured in the viscosity measurement process is larger than a preset threshold value, a value of a frequency of the ultrasonic waves applied in the ultrasonic wave application process is increased and the ultrasonic wave application process is performed.

* * * * *